United States Patent
Zhang

(10) Patent No.: US 9,176,356 B2
(45) Date of Patent: Nov. 3, 2015

(54) PIXEL UNIT, PIXEL ARRAY STRUCTURE AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventor: Weiwei Zhang, Shanghai (CN)

(73) Assignees: Shanghai AVIC Optoelectronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 45 days.

(21) Appl. No.: 14/225,372

(22) Filed: Mar. 25, 2014

(65) Prior Publication Data

US 2015/0138473 A1    May 21, 2015

(30) Foreign Application Priority Data

Nov. 18, 2013    (CN) .......................... 2013 1 0576427

(51) Int. Cl.
*G02F 1/1343* (2006.01)
*G02F 1/1368* (2006.01)
*G02F 1/1362* (2006.01)

(52) U.S. Cl.
CPC ........ *G02F 1/1368* (2013.01); *G02F 1/134309* (2013.01); *G02F 1/136286* (2013.01)

(58) Field of Classification Search
CPC ................................................ G01F 1/134309
See application file for complete search history.

(56) References Cited

U.S. PATENT DOCUMENTS 5,146,356 A * 9/1992 Carlson ........................... 349/38
7,471,274 B2 * 12/2008 Kim ................................ 345/88

FOREIGN PATENT DOCUMENTS

CN        101114088 A    1/2008
CN        202110358 U    1/2012

* cited by examiner

*Primary Examiner* — Timothy L Rude
(74) *Attorney, Agent, or Firm* — Alston & Bird LLP

(57) ABSTRACT

The present invention discloses a pixel unit, a pixel array structure and a display device, to solve the problem that horizontal stripes may occur between adjacent rows in a conventional pseudo dual-domain pixel display. The pixel unit of the present invention comprises a first pixel unit and a second pixel unit arranged adjacent to each other and have a shape of a parallelogram. A long edge direction of the first pixel unit is consistent with a short edge direction of the second pixel unit, or a short edge direction of the first pixel unit is consistent with a long edge direction of the second pixel unit. The first pixel unit and the second pixel unit are driven by different thin film transistors, so that electrode domain inclination directions of the pixel units in adjacent rows are alternate to avoid the occurrence of horizontal stripes when the pseudo dual-domain display is performed.

14 Claims, 6 Drawing Sheets

PIXEL UNIT, PIXEL ARRAY STRUCTURE AND DISPLAY DEVICE

CROSS-REFERENCES TO RELATED APPLICATIONS

This application claims the benefit of priority to Chinese Patent Application No. 201310576427.1, filed with the Chinese Patent Office on Nov. 18, 2013 and entitled "PIXEL UNIT, PIXEL ARRAY STRUCTURE, AND DISPLAY DEVICE", the content of which is incorporated herein by reference in its entirety.

FIELD OF THE INVENTION

The present invention relates to the technical field of liquid crystal displays, and in particular to a pixel unit, a pixel array structure, and a display device.

BACKGROUND OF THE INVENTION

A conventional liquid crystal display comprises a multitude of pixel units arranged in a matrix and a drive circuit driving the pixel units. Deflection of liquid crystal molecules is achieved by varying an electric field in a liquid crystal layer to realize a display effect.

In order to improve the display effect, multi-domain display technology has been widely used, where a multi-domain pixel structure is designed in a pixel in the existing multi-domain display, or in order to avoid the color cast problem caused by the multi-domain design in one pixel, different domain directions are designed in adjacent pixels to realize a pseudo multi-domain pixel structure.

FIG. 1A is a schematic diagram of a structure of an existing pixel unit, and FIG. 1B is a schematic diagram of an existing pixel array structure. As shown in FIG. 1A, a pixel unit in an existing pseudo dual-domain pixel structure comprises a first pixel unit 101 and a second pixel unit 102, where the two pixel units are driven by different thin film transistors, and the oblique line direction A-A' and the oblique line direction B-B' in the figure respectively represent domain inclination directions in two adjacent pixel units. As can be seen from FIG. 1A, the domain inclination directions in the two pixel units are different, and the domain inclination directions in the same pixel unit are consistent. After the pixel array structure of FIG. 1B is formed by the pixel units shown in FIG. 1A, the domain inclination directions in the pixel units in the same row direction are the same, and pixel units in two adjacent rows have different domain inclination directions, for example, as shown in FIG. 1B, pixel units in the first row direction are formed by the first pixel units 101, pixel units in the second row direction are formed by the second pixel units 102, pixel units in the third row direction are formed by the first pixel units 101, and the rest can be done in the same manner that domain inclination directions of pixel units in two adjacent rows are different, so that the domain inclination directions of the pixel units at the junction of the adjacent rows are opposite, the display states of the adjacent rows are different when images are displayed, where one is dark and the other is bright, and horizontal stripes may occur at the junction of two adjacent rows.

BRIEF SUMMARY OF THE INVENTION

An object of the present invention is to provide a pixel unit, a pixel array structure and a display device, so as to solve the problem that horizontal stripes may occur at the junction of adjacent rows in the existing pseudo dual-domain pixel display.

In one embodiment of the present invention, a pixel unit includes a first pixel unit and a second pixel unit, wherein the first pixel unit and the second pixel unit are adjacent to each other and have a shape of a parallelogram; a long edge direction of the first pixel unit is consistent with a short edge direction of the second pixel unit, or a short edge direction of the first pixel unit is consistent with a long edge direction of the second pixel unit; and the first pixel unit and the second pixel unit are driven by different thin film transistors.

In the present invention, the first pixel unit and the second pixel unit are adjacent to each other, and the long edge direction of the first pixel unit is consistent with the short edge direction of the second pixel unit, or the short edge direction of the first pixel unit is consistent with the long edge direction of the second pixel unit, so that the first pixel unit and the second pixel unit at adjacent positions are arranged alternately, and the electrode domain inclination directions of the pixel units in adjacent rows are also alternate to thereby avoid the occurrence of horizontal stripes when the pseudo double-domain display is performed.

In another embodiment of the present invention, a pixel array structure may include a number of the above-described pixel units.

In yet another embodiment of the present invention, a display device may include the above-described pixel array structure.

By means of the pixel array structure and the display device according to the present invention, electrode domain inclination directions of adjacent pixel units in the pixel array structure can be alternate in both the row direction and the column direction so as to inhibit the occurrence of horizontal stripes.

DETAILED DESCRIPTION OF THE INVENTION

Technical solutions in the embodiments of the present invention will be described below in a clear and complete manner in conjunction with drawings in the embodiments of the present invention. The present invention will be described with reference to specific embodiments, it is to be understood that variations and modifications are possible.

In an embodiment of the present invention, in order to inhibit the horizontal stripe phenomenon when images are displayed in a pseudo dual-domain pixel structure, a pixel unit may have a shape that adjacent pixel units in the pixel array structure are arranged alternately in the horizontal or vertical direction, and as a result, domain inclination directions of pixels in the pixel units in the horizontal or vertical direction are also alternate, and domain inclination directions of pixel units in the same row or same column are alternate, so as to effectively inhibit the occurrence of horizontal stripes.

In an embodiment of the present invention, a pixel unit includes a first pixel unit and a second pixel unit arranged adjacent to each other and have a shape of a parallelogram.

Figure 1A:
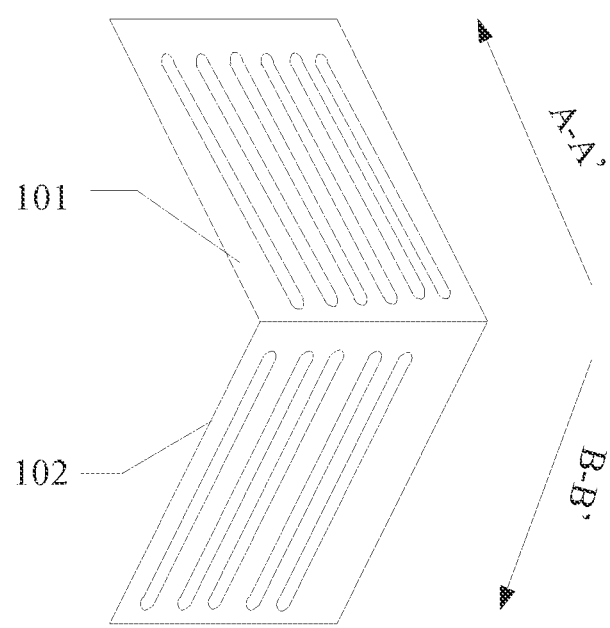
FIG. 1A is a schematic diagram of a structure of a conventional pixel unit.
Figure 1B:
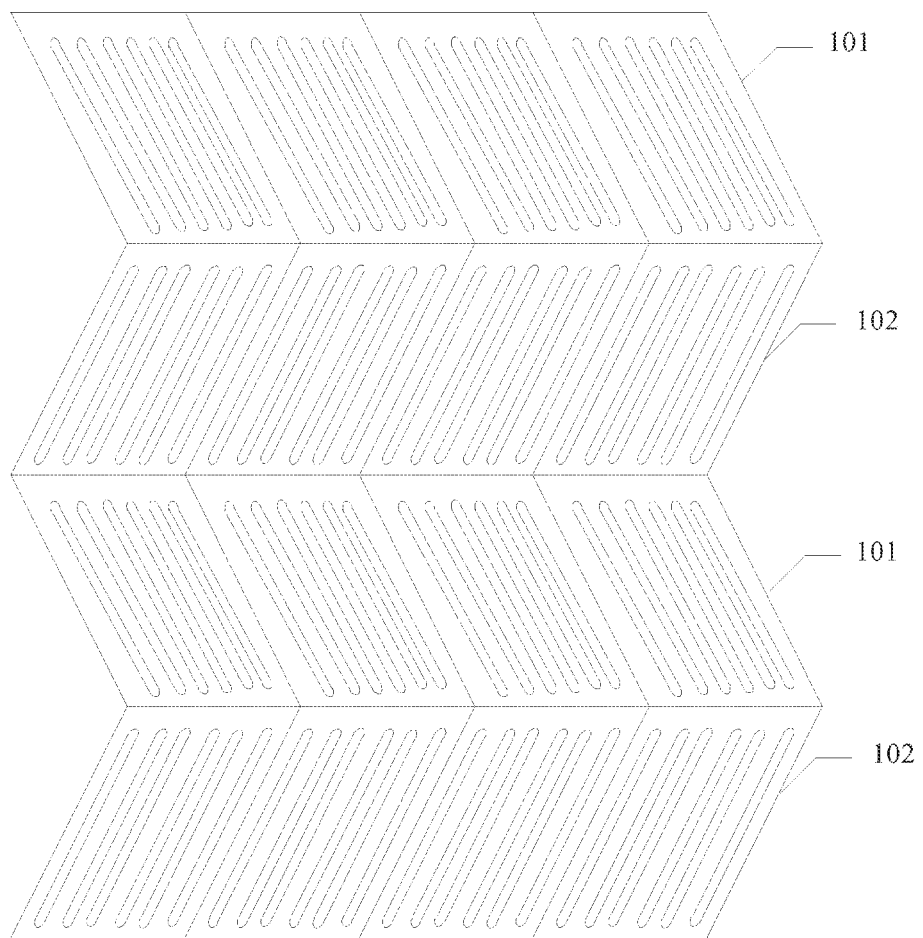
FIG. 1B is a schematic diagram of a conventional pixel array structure.
Figure 2A:
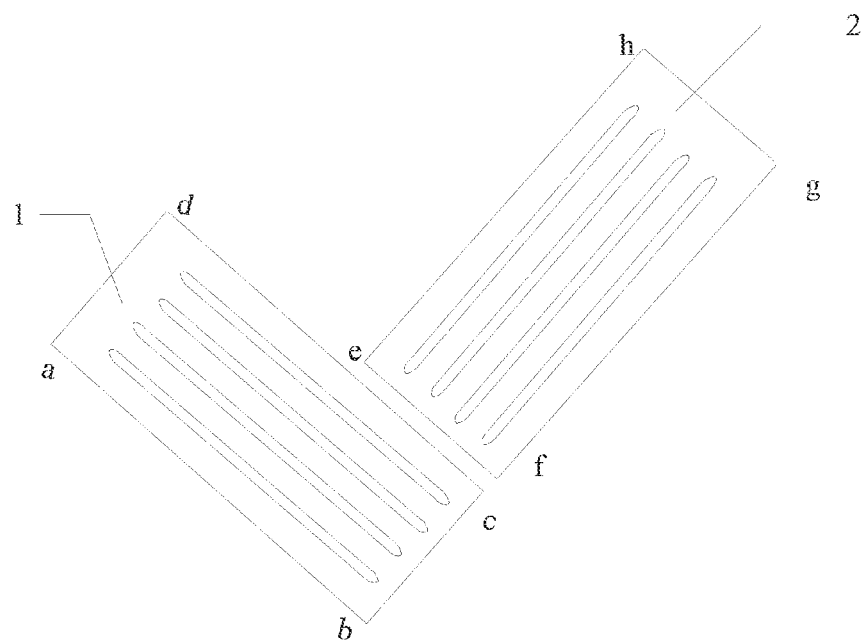
FIGS. 2A-2B are schematic diagrams of structures of pixel units according to certain embodiments of the present invention.
Figure 2B:
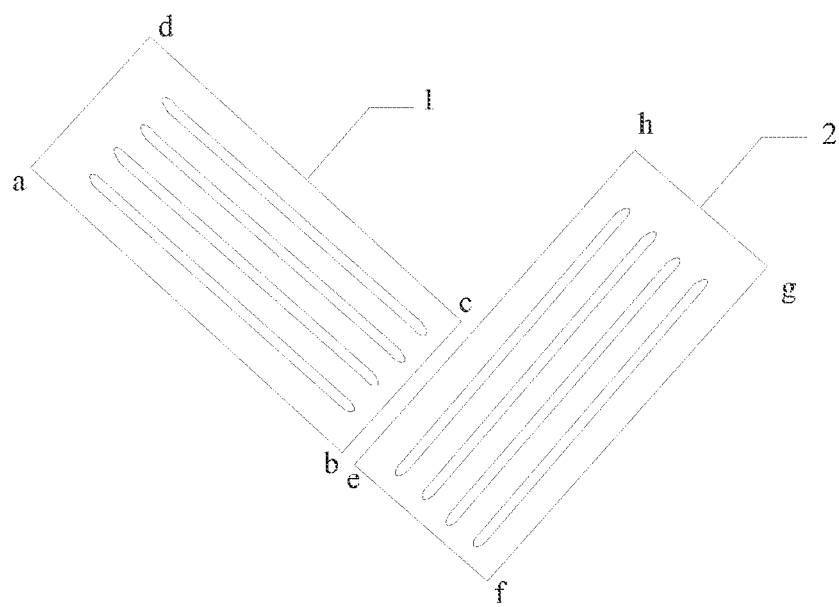

FIGS. 2A-2B are schematic diagrams of structures of pixel units according to some embodiments of the present invention. Specifically, as shown in FIG. 2A, the long edge direction of the first pixel unit 1 is consistent with the short edge direction of the second pixel unit 2, that is, the direction of the long edge "ab" and the direction of the long edge "cd" of the first pixel unit 1 are parallel to the direction of the short edge "ef" and the direction of the short edge "gh" of the second pixel unit 2.

Further, as shown in FIG. 2B, in one embodiment of the present invention, it is also possible that the short edge direction of the first pixel unit 1 is consistent with the long edge direction of the second pixel unit 2, that is, the direction of the short edge "ad" and the direction of the short edge "bc" of the first pixel unit 1 are parallel to the direction of the long edge "eh" and the direction of the long edge "fg" of the second pixel unit 2.

It should be noted that data lines and gate lines are arranged between the first pixel unit 1 and the second pixel unit 2 and are not shown in the figures, so the direction consistency involved in the embodiments of the present invention indicates that two edges of the parallelograms of the pixel units are parallel to each other or disposed on the same straight line, excluding the overlapping condition.

In addition, the first pixel unit 1 and the second pixel unit 2 in the embodiments of the present invention are driven by different thin film transistors, that is, the pixel unit in the embodiment of the present invention is a pseudo dual-domain pixel structure.

In an embodiment of the present invention, a long edge of the first pixel unit 1 and a short edge of the second pixel unit 2 are on the same straight line, and the projection of a short edge, close to the second pixel unit 2, of the first pixel unit 1 along the direction perpendicular to the short edge is completely located on a long edge of the second pixel unit 2, where the long edge of the second pixel unit 2 is adjacent to the first pixel unit 1. For example, as shown in FIG. 2B, the long edge "ab" of the first pixel unit 1 and the short edge "ef" of the second pixel unit 2 are formed on the same straight line, and the short edge "bc" of the first pixel unit 1 is close to the second pixel unit 2, where the projection of the short edge "bc" along the direction perpendicular to the short edge "bc" is completely located on the long edge "eh" of the second pixel unit 2, and the long edge "eh" is adjacent to the first pixel unit 1, that is, the final effect is shown in FIG. 2B.

In an embodiment, in an embodiment of the present invention, it is also possible that a short edge of the first pixel unit 1 and a long edge of the second pixel unit 2 are on the same straight line, and the projection of a short edge, close to the first pixel unit 1, of the second pixel unit 2 along the direction perpendicular to the short edge is completely located on a long edge of the first pixel unit 1, where the long edge of the first pixel unit 1 is adjacent to the second pixel unit 2. For example, as shown in FIG. 2A, the short edge "bc" of the first pixel unit 1 and the long edge "fg" of the second pixel unit 2 are on the same straight line, and the short edge "ef" of the second pixel unit 2 is close to the first pixel unit 1, where the projection of the short edge "ef" along the direction perpendicular to the short edge "ef" is completely located on the long edge "cd" of the first pixel unit 1, and the long edge "cd" is adjacent to the second pixel unit 2.

In an embodiment, the shapes of the first pixel unit 1 and the second pixel unit 2 in the embodiment of the present invention can be configured in multiple manners, one optional manner in the embodiment of the present invention is as follows: the shapes of the first pixel unit 1 and the second pixel unit 2 are configured to be rectangles, and since the shape of the existing pixel unit is also a rectangle, the existing pixel unit can be rotated a certain angle to obtain the rectangular pixel unit involved in the embodiment of the present invention, and the implementation is simple.

In addition, in order to better inhibit the occurrence of the horizontal stripe phenomenon, in an embodiment of the present invention, the shapes of the first pixel unit 1 and the second pixel unit 2 may have a shape of a parallelogram, whose interior angles are not right angles. By means of the parallelograms of which interior angles are not right angles, the domain inclination directions of electrodes in the pixel units are alternate in a certain degree in the row direction and the column direction after a pixel array is formed by the pixel units, so that the occurrence of horizontal stripes can be inhibited to improve the display effect.

In an embodiment of the present invention, when the first pixel unit 1 and the second pixel unit 2 have the shape of a parallelogram, it is preferably that the pixel units can be fully distributed on the whole display panel. In an embodiment of the present invention, the length ratio of the short edge of the first pixel unit 1 to the long edge of the second pixel unit 2 is 1:2, or the length ratio of the short edge of the second pixel unit 2 to the long edge of the first pixel unit 1 is 1:2.

In an embodiment, the pixel unit may include a pixel electrode and a common electrode arranged on the same plane, and there is a certain domain inclination angle between the pixel electrode and the common electrode.

In an embodiment of the present invention, the angles of the parallelograms of the first pixel unit 1 and the second pixel unit 2 can be configured in the following manner.

Figure 2C:
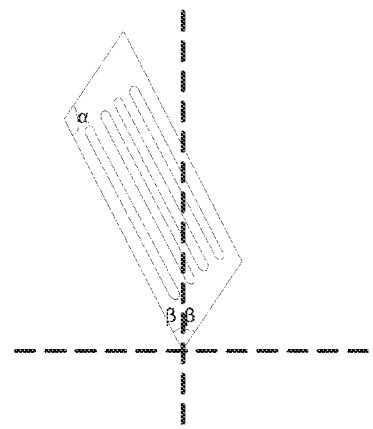
FIG. 2C is a schematic diagram of angle configuration of the parallelogram of the pixel unit according to an embodiment of the present invention.

FIG. 2C shows a schematic diagram of angle configuration of the parallelogram of the pixel unit according to the embodiment of the present invention. As shown in FIG. 2C, the parallelogram has four interior angles, wherein two interior angles are obtuse angles, and the other two interior angles are acute angles. The obtuse angles of the parallelograms of the first pixel unit 1 and the second pixel unit 2 are set to a, and a meets the following relation:

$\alpha=180°-2\beta$, wherein $\beta$ is the domain inclination angle between the pixel electrode and the common electrode in the first pixel unit or the second pixel unit.

An embodiment of the present invention further provides a pixel array structure, where the pixel array structure comprises the above-described pixel units.

Figure 3:
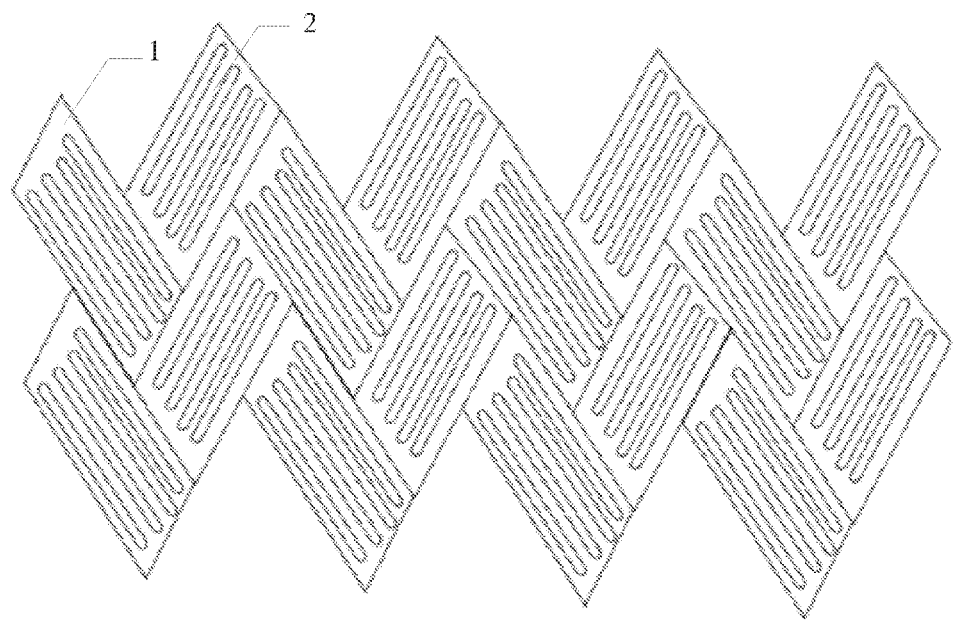
FIG. 3 is a schematic diagram of a pixel array structure according to an embodiment of the present invention.

FIG. 3 is a schematic diagram of the pixel array structure according to an embodiment of the present invention. As shown in FIG. 3, in each row of pixel units, the first pixel units 1 and the second pixel units 2 are arranged alternately and adjacent to each to other, and the domain inclination directions of the first pixel units 1 and the second pixel units 2 are different, so that in the pixel array structure, the domain inclination directions of the pixel units in the same row or same column are alternate, and the domain inclination directions in respective pixel units in the horizontal or vertical direction are also alternate, so as to effectively inhibit the occurrence of horizontal stripes.

Figure 4A:
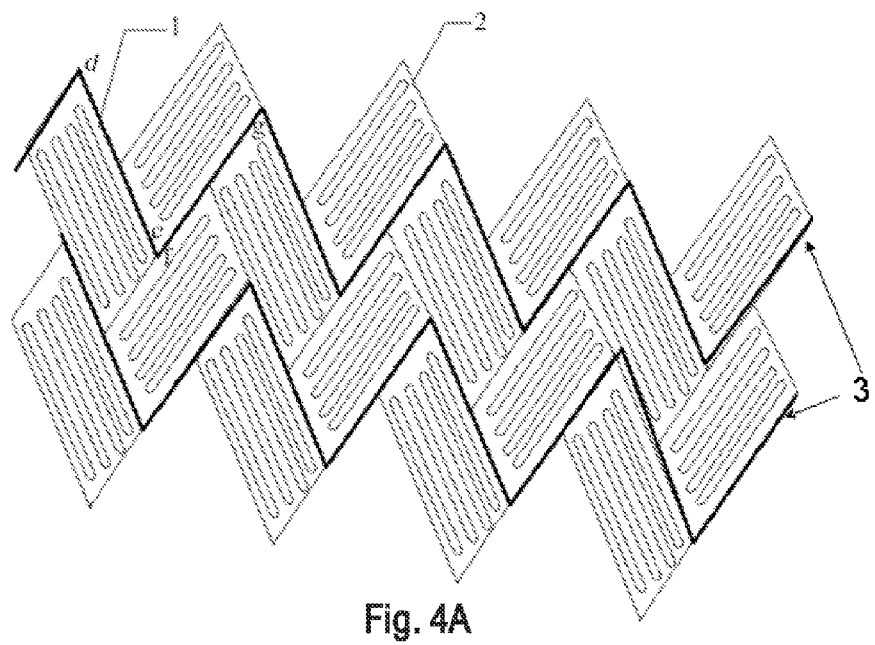
FIGS. 4A-4B are schematic diagrams of arrangement of gate lines and data lines in the pixel array structure according to an embodiment of the present invention.
Figure 4B:
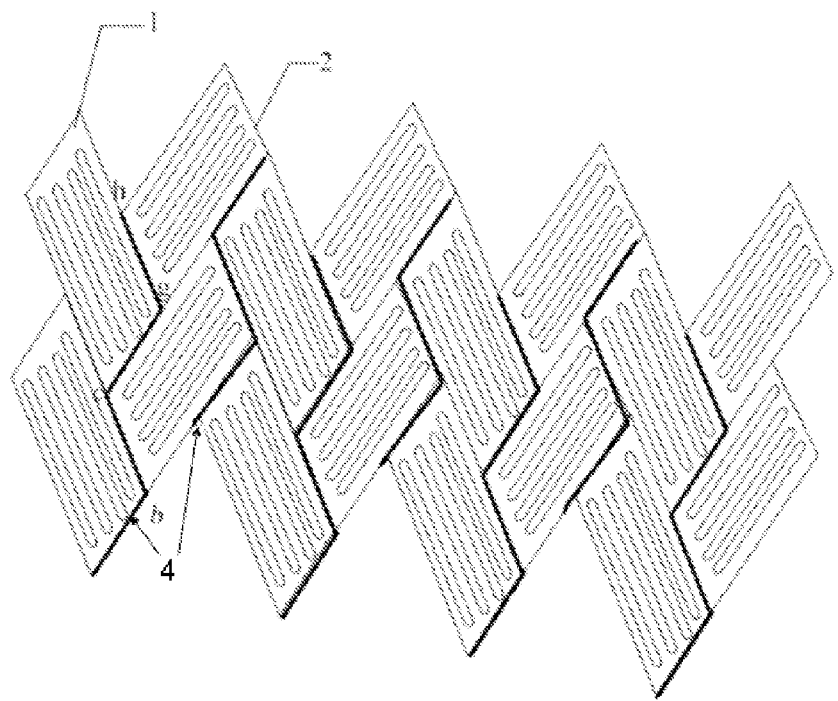

FIGS. 4A-4B are schematic diagrams of arrangement of gate lines and data lines in the pixel array structure according to an embodiment of the present invention. In this case, thin film transistors driving the first pixel units 1 and the second pixel units 2 are different thin film transistors and are connected to the gate lines and the data lines, respectively. In FIG. 4A, the lines arranged along the direction of the long edges "dc" of the first pixel units 1 and the direction of the long edges "fg" of the second pixel units 2, and arranged in a zigzag-shaped line representing gate lines 3; and in the FIG. 4B, the lines arranged along the direction of the short edges "hg" of the second pixel units 2 and the direction of the short edges "gc" of the first pixel units 1, and arranged in a zigzag-shaped line representing data lines 4.

Figure 5:
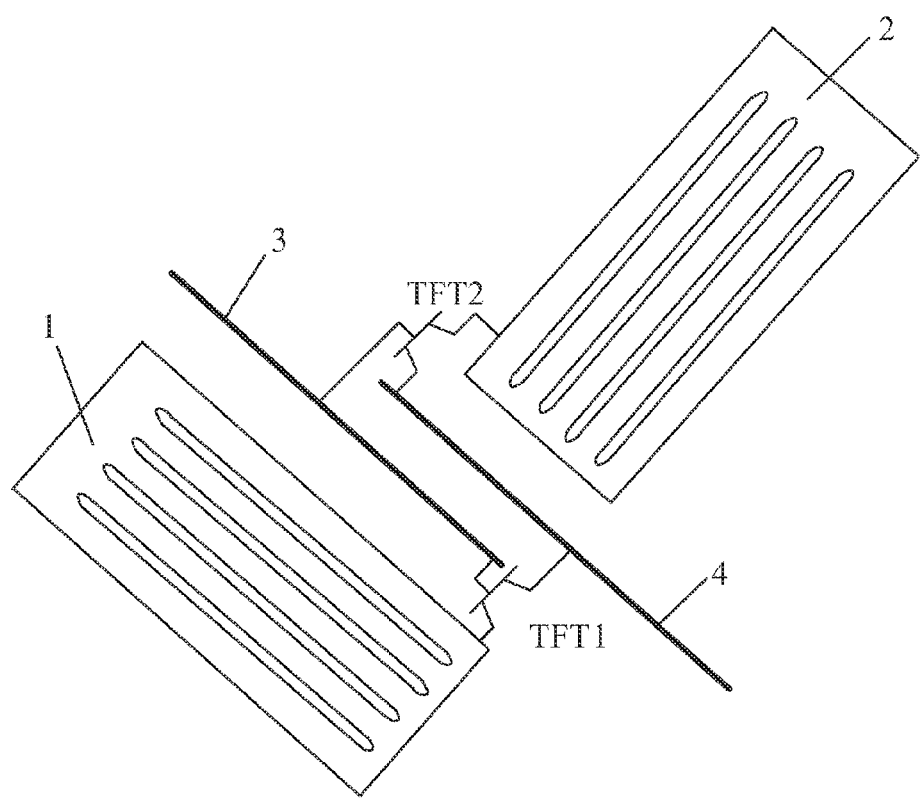
FIG. 5 is a schematic diagram of an example of arrangement of a gate line, a data line and thin film transistors in the pixel array structure according to an embodiment of the present invention.

FIG. 5 is a schematic diagram of an example of arrangement of a gate line, a data line and thin film transistors in the pixel array structure according to an embodiment of the present invention. In this example, as shown in FIG. 5, a first thin film transistor TFT1 drives the first pixel unit 1, where a gate electrode of the first thin film transistor TFT1 is connected electrically to the gate line 3, a source electrode of the first thin film transistor TFT1 is connected electrically to the data line 4, and a drain electrode of the first thin film transistor TFT1 is connected electrically to the first pixel unit 1. A second thin film transistor TFT2 drives the second pixel unit 2, where a gate electrode of the second thin film transistor TFT2 is connected electrically to the gate line 3, a source electrode of the second thin film transistor TFT2 is connected electrically to the data line 4, and a drain electrode of the second thin film transistor TFT2 is connected electrically to the second pixel unit 2. Particularly, in FIG. 5, the thin film transistors are drawn outside the respective pixel units to clearly show the connection relationship, but in fact the thin film transistors are arranged in the respective pixel units. It will be appreciated that the arrangement in FIG. 5 is for illustrative purposes only, and this example of the arrangement is an example of description rather than of limitation. Thus any other suitable arrangement can also be used.

An embodiment of the present invention further provides a display device. The display device comprises the above-described pixel array structure, of which the specific description can refer to the above-mentioned pixel array structure and pixel unit structure, and will not be repeated herein for the sake of brevity.

The pixel unit according to specific embodiments of the present invention has such a shape that the electrode domain inclination directions of adjacent pixel units in the pixel array structure are alternate in the row direction and the column direction, so that the occurrence of horizontal stripes can be better inhibited.

It should be noted that the schematic diagrams of the shape of the pixel unit and the pixel array structure shown in the drawings of the embodiments of the present invention are for illustration by way of examples, other shapes and array structures can also be included, and the present invention is not limited thereto.

Obviously, various modifications and variations can be made by those skilled in the art without departing from the spirit and scope of the present invention. Thus the invention is intended to encompass these modifications and variations thereto so long as these modifications and variations come into the scope of the claims of the invention and equivalents thereof.

What is claimed is:

1. A pixel unit comprising a first pixel unit and a second pixel unit, wherein:
   the first pixel unit and the second pixel unit are adjacent to each other and have a shape of a parallelogram;
   a long edge direction of the first pixel unit is consistent with a short edge direction of the second pixel unit, or a short edge direction of the first pixel unit is consistent with a long edge direction of the second pixel unit; and
   the first pixel unit and the second pixel unit are driven by a first thin film transistor and a second thin film transistor, respectively.

2. The pixel unit of claim 1, wherein a long edge of the first pixel unit and a short edge of the second pixel unit are on a same straight line, and a projection of a short edge, close to the second pixel unit, of the first pixel unit along a direction perpendicular to the short edge is completely located on a long edge of the second pixel unit, wherein the long edge of the second pixel unit is adjacent to the first pixel unit; or
   a short edge of the first pixel unit and a long edge of the second pixel unit are on a same straight line, and a projection of a short edge, close to the first pixel unit, of the second pixel unit along a direction perpendicular to the short edge is completely located on a long edge of the first pixel unit, wherein the long edge of the first pixel unit is adjacent to the second pixel unit.

3. The pixel unit of claim 2, wherein the shape of the parallelogram is rectangular or interior angles of the parallelogram are not right angles.

4. The pixel unit of claim 3, wherein,
   a length ratio of the short edge of the first pixel unit to the long edge of the second pixel unit is 1:2; or
   a length ratio of the short edge of the second pixel unit to the long edge of the first pixel unit is 1:2.

5. The pixel unit of claim 2, wherein,
   a length ratio of the short edge of the first pixel unit to the long edge of the second pixel unit is 1:2; or
   a length ratio of the short edge of the second pixel unit to the long edge of the first pixel unit is 1:2.

6. The pixel unit of claim 1, wherein each of the first pixel unit and the second pixel unit comprises a pixel electrode and a common electrode arranged on a same plane, and a domain inclination angle is formed between the pixel electrode and the common electrode.

7. The pixel unit of claim 1, wherein,
   a length ratio of the short edge of the first pixel unit to the long edge of the second pixel unit is 1:2; or
   a length ratio of the short edge of the second pixel unit to the long edge of the first pixel unit is 1:2.

8. The pixel unit of claim 1, wherein each of the thin film transistors driving the first pixel unit and the second pixel unit is connected to a gate line and a data line; and
   the gate line and the data line are arranged along the long edge direction and the short edge direction of the first pixel unit and/or the second pixel unit.

9. A pixel array structure comprising a plurality of pixel units, wherein each of the pixel units comprises a first pixel unit and a second pixel unit, wherein:
   the first pixel unit and the second pixel unit are adjacent to each other and have a shape of a parallelogram;
   a long edge direction of the first pixel unit is consistent with a short edge direction of the second pixel unit, or a short edge direction of the first pixel unit is consistent with a long edge direction of the second pixel unit; and
   the first pixel unit and the second pixel unit are driven by a first thin film transistor and a second thin film transistor.

10. The pixel array structure of claim 9, wherein a long edge of the first pixel unit and a short edge of the second pixel unit are on a same straight line, and a projection of a short edge, close to the second pixel unit, of the first pixel unit along a direction perpendicular to the short edge is completely located on a long edge of the second pixel unit, wherein the long edge of the second pixel unit is adjacent to the first pixel unit; or a short edge of the first pixel unit and a long edge of the second pixel unit are on a same straight line, and a projection of a short edge, close to the first pixel unit, of the second pixel unit along a direction perpendicular to the short edge is completely located on a long edge of the first pixel unit, wherein the long edge of the first pixel unit is adjacent to the second pixel unit.

11. The pixel array structure of claim 9, wherein, a length ratio of the short edge of the first pixel unit to the long edge of the second pixel unit is 1:2; or a length ratio of the short edge of the second pixel unit to the long edge of the first pixel unit is 1:2.

12. The pixel array structure of claim 9, wherein the thin film transistors driving the first pixel unit and the thin film transistors driving the second pixel unit are different thin film transistors and each of the thin film transistors is connected to a gate line and a data line.

13. The pixel array structure of claim 12, wherein the gate line and the data line are zigzag-shaped lines.

14. A display device comprising the pixel array structure including a plurality of pixel units, each of the pixel units having a first pixel unit and a second pixel unit, wherein:

the first pixel unit and the second pixel unit are adjacent to each other and have a shape of a parallelogram;

a long edge direction of the first pixel unit is consistent with a short edge direction of the second pixel unit, or a short edge direction of the first pixel unit is consistent with a long edge direction of the second pixel unit; and the first pixel unit and the second pixel unit are driven by a first thin film transistor and a second thin film transistor.

\* \* \* \* \*